United States Patent
Vohra et al.

(10) Patent No.: US 6,580,855 B1
(45) Date of Patent: Jun. 17, 2003

(54) BANDWIDTH TUNABLE GRATINGS FOR DYNAMIC DISPERSION COMPENSATION IN LIGHTWAVE

(75) Inventors: Sandeep T. Vohra, Fairfax Station, VA (US); Chia Chen Chang, Rockville, MD (US); Bryan Althouse, Annapolis, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 205 days.

(21) Appl. No.: 09/684,816

(22) Filed: Oct. 10, 2000

(51) Int. Cl.[7] .................................................. G02B 6/34
(52) U.S. Cl. ....................................................... 385/37
(58) Field of Search ..................................... 385/37, 13

(56) References Cited

U.S. PATENT DOCUMENTS

| | | | | |
|---|---|---|---|---|
| 5,469,520 A | * | 11/1995 | Morey et al. | 359/130 |
| 5,574,807 A | | 11/1996 | Snitzer | 385/24 |
| 5,699,468 A | | 12/1997 | Farries et al. | 385/140 |
| 5,982,518 A | | 11/1999 | Mizrohi | 359/130 |
| 6,330,383 B1 | * | 12/2001 | Cai et al. | 359/130 |
| 6,400,869 B2 | * | 6/2002 | Pan et al. | 385/10 |

OTHER PUBLICATIONS

Vohra et al; Dynamic Dispersion Compensation Using Bandwith Tunable Fiber Bragg Grating; E COL 2000; Not Yet Accepted.

* cited by examiner

Primary Examiner—Hung N. Ngo
(74) Attorney, Agent, or Firm—John J. Karasek; John Gladstone Mills, III

(57) ABSTRACT

A bandwidth tunable fiber Bragg grating (FBG) device performs tuning in an optical transmission circuit by placing a grating in a compliant material, which is transversely loaded to create longitudinal strain through the Poisson effect of materials. Careful application of various load magnitudes along the length of the grating through the compliant material creates a strain gradient along the length of the grating, which chirps the grating thus resulting in altering the bandwidth of the grating. Tuning the grating bandwidth results, effectively, in tuning the dispersion of light being reflected off the grating. Insertion of such a device in the optical link allows for dynamic dispersion compensation in the link. The ability of the device to 'dial-in' a desired amount of dispersion is what makes it valuable.

5 Claims, 4 Drawing Sheets

BANDWIDTH TUNABLE GRATINGS FOR DYNAMIC DISPERSION COMPENSATION IN LIGHTWAVE

BACKGROUND OF THE INVENTION

1. Field of the Invention

This invention pertains generally to a spectrum bandwidth tuning apparatus and more specifically to a device for dynamic dispersion compensation in an optical link utilizing Bragg gratings.

2. Description of the Prior Art

Chromatic dispersion is an impairment to transmission of optical pulses in optical media, such as an optical fiber. Typically dispersion impairments in optical communication systems are alleviated by the use of dispersion compensating fibers, which are placed at strategic locations in an optical link. This method known as dispersion management has been successful but requires that the optical paths remain relatively static. However, in optical networks of the future the path that an optical signal takes within the network will be a dynamic parameter due to reconfigurability requirement. Additionally, the tolerances for dispersion compensation becomes tighter as the bit rate increases. These two effects combine to force a requirement in optical networks to have dynamic or tunable dispersion compensating devices at various locations in the network.

Dynamically reconfigurable dispersion compensating devices are being actively developed due to the need for dynamic adjustment of dispersion in future high bit rate optical networks. Dynamic dispersion compensation is necessary due to unpredictable variations in the optimal dispersion map caused by network reconfiguration, fiber nonlinearities and signal power variations which may occur due to changes in optical amplifier gain flatness or due to the insertion of new optical networking elements, for instance a reconfigurable add/drop multiplexer. Dynamic dispersion compensation becomes more significant as optical networks progress towards higher bit rates as the dispersion tolerance reduces dramatically (as the square of the bit rate). In order to mitigate this problem, development of high performance, reliable, dynamic chromatic dispersion compensating devices is important.

SUMMARY OF THE INVENTION

The object of this invention is to provide a device that effectively accomplishes dynamic dispersion compensation in optical links.

Another object of this invention is to provide a device for reconfigurable, high-speed optical networks of the future.

Another object of this invention is to provide a device for performing a critical dispersion compensation measurement in a short pulse.

These and other objectives are achieved by a bandwidth tunable fiber Bragg grating (FBG) device wherein tuning is performed by placing a grating in a compliant material, which is transversely loaded to create longitudinal strain through the Poisson effect in compliant materials. Careful application of various load magnitudes along the length of the grating through the compliant material creates a strain gradient along the length of the grating, which chirps the grating thus resulting in altering the bandwidth of the grating. Tuning the grating bandwidth results, effectively, in tuning the dispersion of light being reflected off the grating. Insertion of such a device in the optical link allows for dynamic dispersion compensation in the link. The ability of the device to 'dial-in' a desired amount of dispersion is what makes it valuable in reconfigurable optical networks.

DESCRIPTION OF THE PREFERRED EMBODIMENT

In a bandwidth tunable fiber Bragg grating device (FBG), tuning is performed by placing a grating in a compliant material, which is transversely loaded to create longitudinal strain through the Poisson effect of materials. Careful application of various load magnitudes along the length of the grating through the compliant material creates a strain gradient along the length of the grating, which chirps the grating thus resulting in altering the bandwidth of the grating. Tuning the grating bandwidth results, effectively, in tuning the dispersion of light being reflected off the grating. Insertion of such a device in the optical link allows for dynamic dispersion compensation in the optical link. The ability of the device to 'dial-in' a desired amount of dispersion is what makes it valuable.

Figure 1:
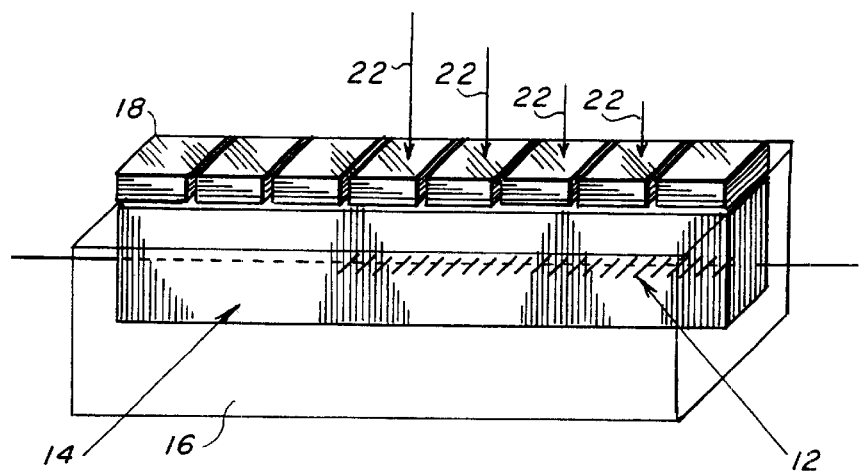
FIG. 1 shows a schematic of a bandwidth tunable fiber Bragg grating (FBG) device used for dynamic dispersion tuning.
Figure 2:
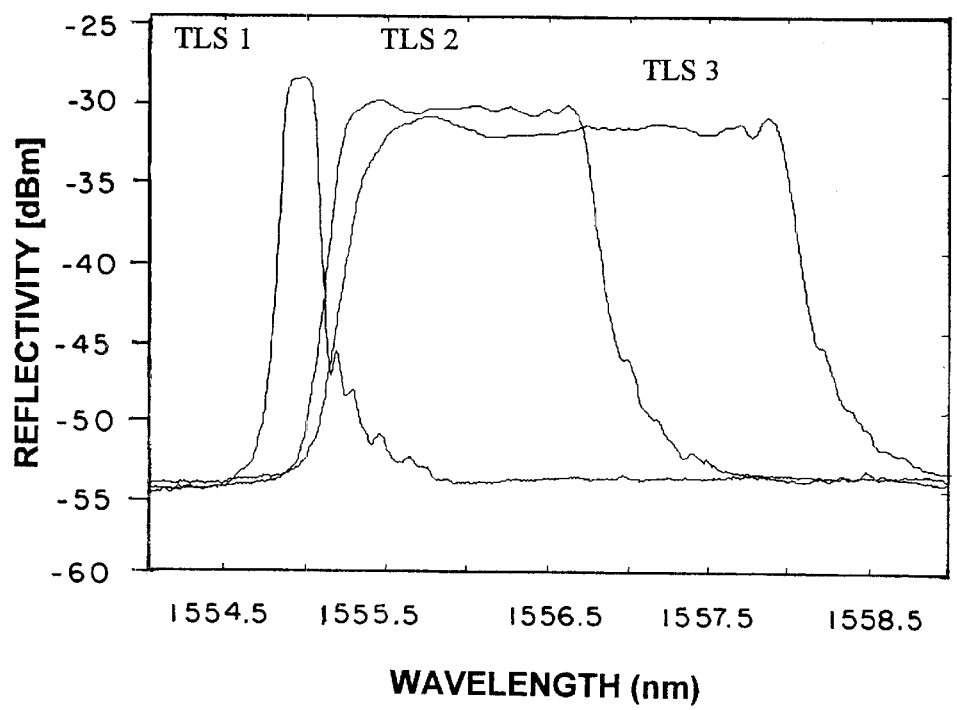
FIG. 2 shows the reflectivity spectra of a FBG device for various transverse load sequences (TLS).

In the bandwidth tunable fiber Bragg grating device 10, as shown in FIG. 1, a length of fiber Bragg grating 12 (FBG) should be of sufficient length as to create a proper gradient along its length. A grating 12 length greater than 10 mm is preferred, however other lengths may be applicable in specific conditions, to create a sufficient strain gradient along its length in order to create sufficient chirp. The FBG 12 is embedded inside a compliant material 14, such as a polymer or rubber. The exact size of the compliant material 14 with respect to the grating 12 length and the choice of material 14 are a variable but certain relationships tend to optimize the device 10 performance. The grating 12 is positioned in the compliant material 14 such that one end of it is near the edge of the compliant material 14, this allows for a built-in strain gradient near the edge of the grating 12. The embedded grating 12 is placed in an assembly 16 capable of providing variable amounts of transverse loading 18 along various locations 22 on the surface of the compliant material 14. The transverse load along the various locations 22 along the length of the compliant material 14 results in a longitudinal strain gradient in the gratings 12, thus inducing chirp. Variation of the magnitude of the transverse loads applied at the various locations 22 results in a variance of the chirp, which tunes the dispersion. Variable transverse load magnitudes at the various locations 22 may be applied at the various locations along the length of the grating 12 by using electrical actuators (not shown), thus allowing for relatively rapid dispersion tuning. A typical result of the application of the various transverse loads at various locations 22 on the grating 12 are shown in FIG. 2. The device 10 is capable of tuning the FBG bandwidth from 0.14 nm to about 3 nm in a continuous manner. This results in dispersion tuning of approximately −150 ps/nm to −3500 ps/nm, considering the grating length of approximately 50 nm.

Figure 3:
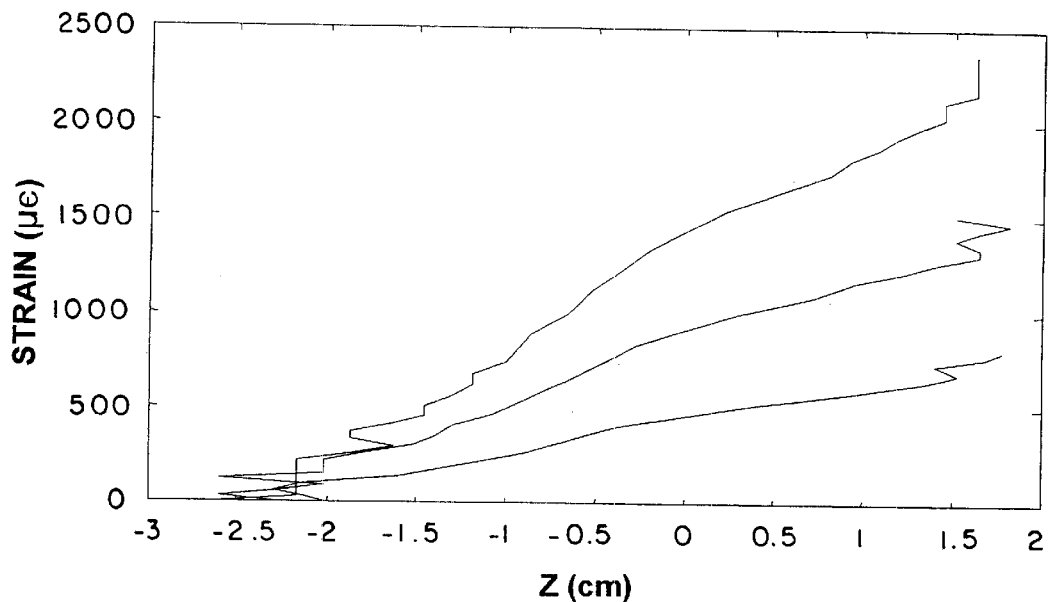
FIG. 3 shows a strain profile along the grating length for various transverse load magnitudes.

It is important requirement for creating a chirp in the grating 12 to measure the gratings 12 strain gradient. This is done with a number of techniques well known to those skilled in the art, such as a fiber interferometric technique. The results of such a technique are shown in FIG. 3. The data clearly shows that the strain gradient is 'smooth' along the length of the grating 12 for various combinations of the transverse load sequences at the various locations 22.

Figure 4:
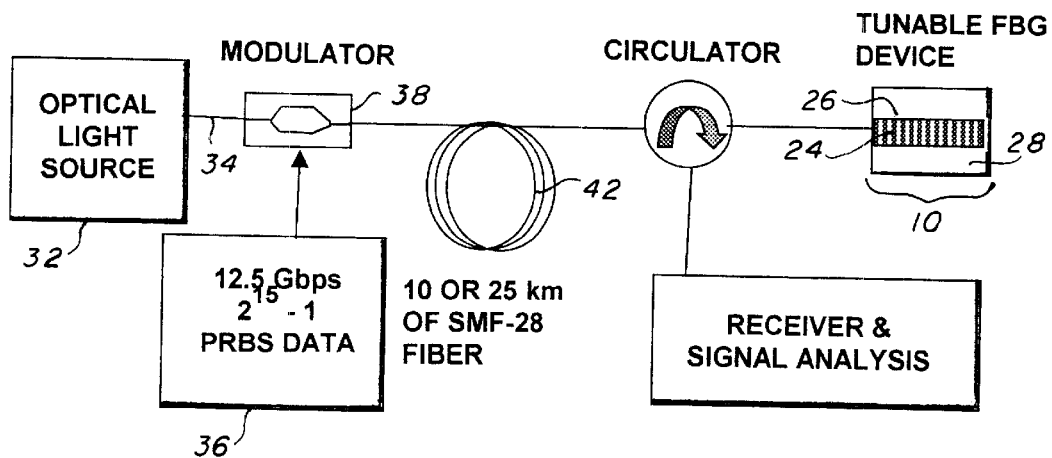
FIG. 4 shows a typical transmission device utilizing a tunable grating device.
Figure 5A:
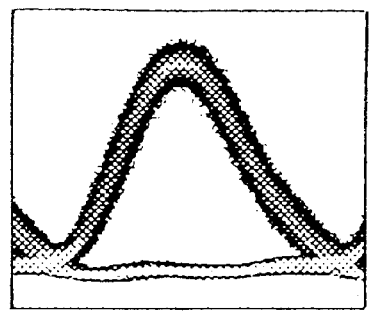
FIG. 5a shows the Q of the launched pulse eye-diagram depicting the state of the short return to zero (RZ) data carrying pulse.
Figure 5B:
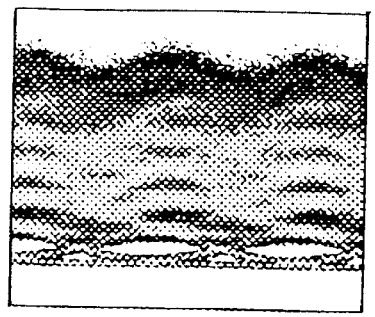
FIG. 5b shows the eye-pattern of the pulse degradation after 6 km of propagation in fiber and no dispersion compensation.
Figure 5C:
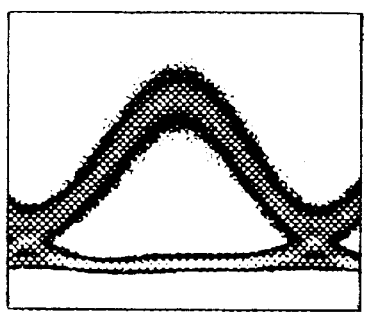
FIG. 5c shows the eye-pattern of the pulse degradation after 10 km of propagation in fiber and no dispersion compensation.
Figure 5D:
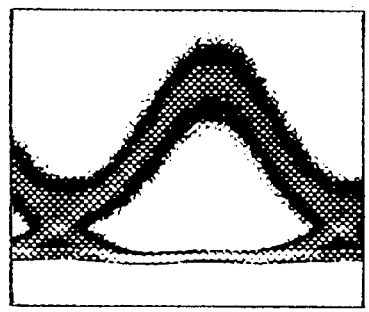
FIG. 5d shows the eye-pattern of the pulse degradation after 25 km of propagation in fiber and with dispersion compensation using a bandwidth tunable fiber Bragg grating device.

Detailed characteristics of the group delay and average deviation from linearity of the device have been obtained through an experimental device 20, a shown in FIG. 4. The eye-patterns of short return to zero (RZ) encoded pulse containing a 12.5 GHz data stream, over a distance of 10 km and 25 km, with good Q measurements. Also measured was the autocorrelation of a data encoded short pulse, which requires smooth grating chirp.

A 50 mm long unchirped, partially apodized fiber Bragg grating 24 was fabricated in a hydrogen loaded photosensitive fiber. The FBG 24 was embedded inside a compliant polymer 26 about 8 cm×1 cm×1 cm in size. The grating 24 was intentionally positioned to be near the edge of the polymer 26. The embedded grating 24 was placed in an assembly 28 capable of providing variable amounts of transverse loading along various locations on the surface of the polymer 26. The transverse load applied at different locations along the length of the polymer 26 resulted in a longitudinal strain gradient in the grating, thus inducing a chirp. Variation of the magnitude of the transverse load resulted in varying chirp, which tunes the dispersion. Variable transverse load magnitudes were applied at various locations along the length of the grating 24 by the use of electrical actuators (not shown), thus allowing for relatively rapid dispersion tuning. The results of the application of various transverse load magnitudes on the grating were similar tho those shown in FIG. 2. The device is capable of tuning the FBG bandwidth within the band previously stated, with the previously noted dispersion tuning A test of the dispersion tunable device 10, as shown in FIG. 1, was conducted by placing it in a transmission experiment, as shown in FIG. 4, having an acutely sensitive to fiber dispersion. The eye-patterns of short RZ encoded pulses containing 12.5 Gbps data stream was recovered over a distance of 10 km and 25 km from an optical transmission fiber 42, with good Q measurements. The autocorrelation of a data encoded short pulse which requires smooth grating chirp was also measured.

RZ encoded short pulse are acutely sensitive to fiber dispersion, compared with non-return to zero (NRZ) coding due to the greater bandwidth. Recovery of a narrow pulse is a critical test of the dispersion compensating grating device 10, as it requires that the grating chirp be smooth. The experimental arrangement, as shown in FIG. 4, has a data bit stream that consisted of 3 ps chirped (1.5–2.0 nm bandwidth) 32 pulses from a optical light source 34, preferably a mode-locked fiber laser, encoded with a 12.5 Gbps, $2^{15}-1$bit pseudo-random pattern 36 using an optical modulator 38, preferably a lithium niobate intensity modulator. The Q was measured from an eye-pattern histogram, the bit-error rate was monitored to confirm error-free operation, and autocorrelation of the received signal was monitored to confirm accurate dispersion compensation.

Figure 6:
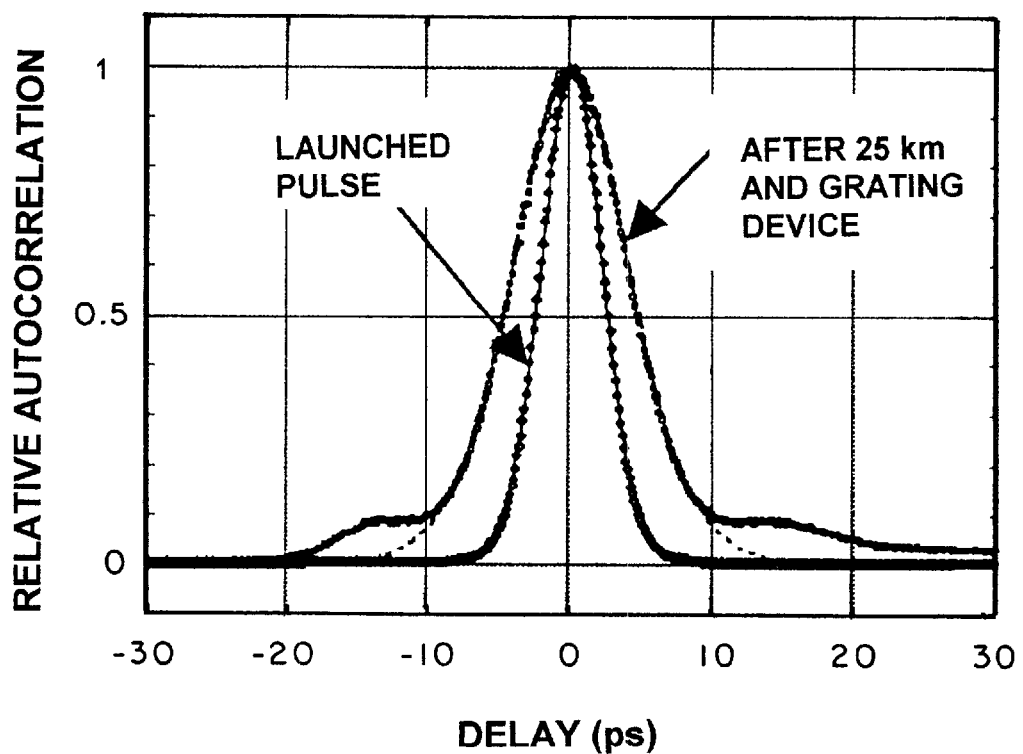
FIG. 6 shows the autocorrelation function of the launched pulse and the pulse after 25 km of transmission.

Eye-diagrams depicting the state of the short, RZ data carrying pulse for various scenarios is shown in FIGS. 5a through 5d. The Q of the launched pulse (FIG. 5a) is measured to be 20.6. As is clear from FIG. 5b, after 6 km of propagation in fiber 42 and no dispersion compensation, pulse degradation is catastrophic. However, after insertion of the bandwidth tunable dispersion compensation device 10 in the link, the eye diagrams were well recovered, both for 10 km (FIG. 5c)(Q=12.2) and 25 km (FIG. 5d) (Q=10.6) fiber 42 spans. There is a dispersion compensation of approximately 22 ps and 550 ps of group delay in the 10 km and 25 km fiber 42 spans, respectively,. This corresponds to tuning the FBG to a bandwidth of about 2.6 nm for the 10 km span and 1.4 nm for the 25 km span. FIG. 6 shows the autocorrelation function of the launched pulse 44 and the pulse after 25 km of propagation 46 with tunable grating assisted dispersion compensation. The data of FIGS. 5a through 5d clearly show that the tunable FBG device 10 is doing an excellent job of dispersion compensation and that the grating 24 is undergoing a smooth grating chirp as it is able to recover the pulse accurately after 25 km of fiber propagation (FIG. 6). The tunable bandwidth FBG device 10 competently accomplishes dynamic dispersion compensation in optical links.

It has been demonstrated that a novel, dynamically reconfigurable dispersion compensating tunable FBG device 10, which is well suited for reconfigurable, high-speed optical networks of the future. A tuning range of −150 ps/nm to −3500 ps/nm has been taught that has the utility of performing a critical dispersion compensation measurement in a short pulse; RZ encode 12.5 Gbps transmission demonstration.

Numerous alternatives of the transverse loading based bandwidth tunable grating device 10 are possible; (1) electrical application of various transverse load magnitudes by means of electrical actuators for increased tuning speed; (2) varying the grating length to provide further tuning of the device; (3) cascading several grating and then tuning each one differently; (4) varying the material compliance by using various materials of mixtures; and (5) varying the design of the 'jig' to apply loads more efficiently.

Although the invention has been described in relation to the exemplary embodiment thereof, it is well understood by those skilled in the art that other variations and modifications can be affected on the preferred embodiment without detracting from the scope and spirit of the invention as set forth in the claims.

What is claimed:

1. A bandwidth tunable fiber Bragg grating (FBG) device for tuning an optical transmission circuit comprised of:
   a plurality of Bragg gratings in cascade along an optical fiber providing a strain gradient along its length in order to create sufficient chirp;
   said cascaded Bragg gratings embedded inside a compliant material positioned in the compliant material such that one end of it is near the edge of the compliant material allowing for a built-in strain gradient near the edge of the grating;

said embedded gratings placed in an assembly capable of providing variable amounts of transverse loading along various locations on the surface of the compliant material resulting in a longitudinal strain gradient in the gratings, thus inducing chirp; and means for varying the grating chirp by changing the magnitude of the transverse loads applied at the various locations through a predetermined range thereby tuning the dispersion in the optical fiber.

2. The device, as in claim 1, wherein the compliant material is a polymer.

3. The device, as in claim 1, wherein the means for varying the grating chirp by varying the magnitude of the transverse loads is an electrical actuator.

4. A bandwidth tunable fiber Bragg grating (FBG) device for tuning an optical transmission circuit comprised of:

a plurality of Bragg gratings in cascade along an optical fiber providing a strain gradient along its length in order to create sufficient chirp;

said cascaded Bragg gratings embedded inside a compliant polymer material positioned in the compliant material such that one end of it is near the edge of the compliant material allowing for a built-in strain gradient near the edge of the grating;

said embedded gratings placed in an assembly capable of providing variable amounts of transverse loading along various locations on the surface of the compliant material resulting in a longitudinal strain gradient in the gratings, thus inducing chirp; and an electrical actuator for varying the grating chirp by changing the magnitude of the transverse loads applied at the various locations through a predetermined range thereby tuning the dispersion in the optical fiber.

5. A method for tuning the dispersion of an optical transmission circuit comprising:

placing a plurality of Bragg gratings in cascade along an optical fiber providing a strain gradient along its length in order to create sufficient chirp;

embedding said cascaded Bragg grating inside a compliant material positioned in the compliant material such that one end is near the edge of the compliant material allowing for a built-in strain gradient near the edge of the grating;

applying a transverse load along various locations on the surface of the compliant material resulting in a longitudinal strain gradient in the gratings, thus inducing chirp;

varying the magnitude of the transverse load applied at various locations by using an electrical actuator through a predetermined range thereby varying the grating chirp and tuning the dispersion in the optical fiber.

\* \* \* \* \*